(12) United States Patent
Dinesh Chheda

(10) Patent No.: US 10,445,828 B2
(45) Date of Patent: Oct. 15, 2019

(54) METHOD AND SYSTEM FOR GENERATING STOCK PRICE ALERTS BASED ON REAL-TIME MARKET DATA

(71) Applicant: Sagar Dinesh Chheda, Bangalore (IN)

(72) Inventor: Sagar Dinesh Chheda, Bangalore (IN)

(73) Assignee: SAGAR DINESH CHHEDA, Kamataka (IN)

( * ) Notice: Subject to any disclaimer, the term of this patent is extended or adjusted under 35 U.S.C. 154(b) by 747 days.

(21) Appl. No.: 14/217,960

(22) Filed: Mar. 18, 2014

(65) Prior Publication Data
US 2014/0289165 A1    Sep. 25, 2014

(51) Int. Cl.
*G06Q 40/04* (2012.01)

(52) U.S. Cl.
CPC .................................... *G06Q 40/04* (2013.01)

(58) Field of Classification Search
CPC ........ G06Q 10/08; G06Q 30/02; G06Q 40/04; G06Q 40/06; G06Q 40/00; G06Q 40/02; G06Q 10/063; G06Q 30/0207; G06Q 30/0201; G06Q 30/0261
See application file for complete search history.

(56) References Cited

U.S. PATENT DOCUMENTS

| | | | | |
|---|---|---|---|---|
| 7,818,232 B1 * | 10/2010 | Mead | ..................... | G06Q 40/06 705/35 |
| 8,972,452 B2 * | 3/2015 | Dave | ................. | G06F 17/30563 707/796 |
| 2002/0046299 A1 * | 4/2002 | Lefeber | ................... | H04L 29/06 719/318 |
| 2003/0078865 A1 * | 4/2003 | Lee | ........................ | G06Q 40/00 705/35 |
| 2007/0198698 A1 * | 8/2007 | Boyd | ................ | G06F 17/30902 709/224 |

(Continued)

FOREIGN PATENT DOCUMENTS

WO    WO-0235400 A1 *    5/2002    ............. G06Q 40/04

OTHER PUBLICATIONS

Business Wire: RealCall and Stock-Alerts.com Partner To Deliver First Mobile Stock Portfolio System with Real Time Voice Alerting, Apr. 6, 2000, Business Editors/High Tech Writers Spring Internet World 2000., pp. 1-3 (Year: 2000).*

(Continued)

*Primary Examiner* — Bijendra K Shrestha
(74) *Attorney, Agent, or Firm* — Barry Choobin; Patent 360 LLC

(57) ABSTRACT

The embodiments herein provide a system and methods for generating stock price alerts based on real-time market data. The system comprises a user mobile device with a mobile application, a central server, and an alerting module. The alerting module tracks and monitors stock price of the stocks to provide an alert with respect to the stocks on periodic intervals based on preset conditions and parameters. The alerting module comprises a feed engine for monitoring the stock exchanges to downloads all the information related to the stocks as feed packets in the central server, a periodic alert engine and a conditional alert engine for processing the feed packets to provides alerts based on the preset alert conditions and an updating engine for updating the matched stock condition and information in a database for a permanent record.

15 Claims, 6 Drawing Sheets

(56) References Cited

U.S. PATENT DOCUMENTS

| | | | | |
|---|---|---|---|---|
| 2008/0109379 A1* | 5/2008 | Cofnas | ............... | G06Q 40/04 |
| | | | | 705/36 R |
| 2010/0049664 A1* | 2/2010 | Kuo | ............... | G06Q 40/00 |
| | | | | 705/36 R |
| 2010/0174666 A1* | 7/2010 | Brandes | ............... | G06Q 10/04 |
| | | | | 705/36 R |
| 2011/0112952 A1* | 5/2011 | Annunziata | ............... | G06Q 40/04 |
| | | | | 705/37 |
| 2013/0279509 A1* | 10/2013 | Kragh | ............... | H04L 49/90 |
| | | | | 370/394 |
| 2013/0325664 A1* | 12/2013 | Alegre | ............... | G06Q 30/08 |
| | | | | 705/26.61 |
| 2014/0129678 A1* | 5/2014 | Herman | ............... | H04L 67/26 |
| | | | | 709/217 |

OTHER PUBLICATIONS

Huang et al.: Replicated Condition Monitoring, 2001, ACM, Department Computer SCience, Stanford, CA, pp. 1-9. (Year: 2001).*

* cited by examiner

METHOD AND SYSTEM FOR GENERATING STOCK PRICE ALERTS BASED ON REAL-TIME MARKET DATA

CROSS-REFERENCE TO RELATED APPLICATIONS

The present invention claims priority to an Indian Provisional Patent Application with serial number 1197/CHE/2013 filed on Mar. 20, 2013 and entitled, "METHOD AND SYSTEM FOR GENERATING STOCK PRICE ALERTS BASED ON REAL-TIME MARKET DATA", the contents a which is incorporated in entirety as reference herein.

BACKGROUND

Technical Field

The embodiments herein are generally related to methods and systems for monitoring a financial market information and remotely informing the users of the occurrence of selected events. The embodiments herein are particularly related to a method of monitoring and tracking the pricing of plurality of stocks. The embodiments herein are more particularly related to a method and system for generating stock price alerts to a user based on real time market data based on price conditions and time periods.

Description of the Related Art

It has long been recognized that access to timely information regarding the current conditions in the various financial and commodities markets is essential to a successful and profitable trading and investment. This is particularly true in today's fast-moving markets where the ability to respond rapidly to the changing market conditions within minutes or hours, rather than days, may mean the difference between the substantial profits or devastating losses. In addition, many complex investment strategies require a precise and careful timing of the specific transactions in response to the fluctuating market conditions, and therefore demand a timely action.

There are stock brokers who assist the buyers and sellers, by advising to buy or sell one or more stocks at a suitable or profitable margin. Also, the tendency of various stock exchanges to change abruptly is common. Thus, the information with the stock buyers may not be the latest and there are chances of providing the outdated information to a client.

Although various information services, such as the stock ticker and, more recently, various computer data networks, have long existed tar providing the information pertaining to the daily activities n the various financial markets, such services arc of little use to the average investor who does not have the time to continuously monitor the received information. As a result, large investors, and those who can afford the continuous monitoring services of investment brokers, have typically had an advantage in the market investments.

Also traders still face a problem of receiving too many alerts, and not enough quality or relevant information of the type that is of interest to them upon which trades are warranted. A related problem is that systems known to date do not provide a sufficient level of granularity to the trader to allow for a customization to generate the alerts tailored to the needs to the user. Further, the combinations of user criteria in connection with a given symbol for generating an alert are not sufficiently provided for in current market alert systems.

Hence, there is a need for a method and system for generating the alerts to a user on a real time market data based on the conditional and periodic settings. Also, there exists a need for a method and system which provides for the customization to generate the market alerts tailored to the user requirements. Further there is a need for a method and system for providing the alerts to the user device through a mobile based application on a periodical basis.

The above mentioned shortcomings, disadvantages and problems are addressed herein and which be understood by reading and studying the following specification.

OBJECTIVES OF THE EMBODIMENTS

The primary object of the embodiments herein is to provide a method and system for generating the stock price alerts to a user based on a real time market data.

Another object of the embodiments herein is to provide a method and system for providing the stock price alerts based on a plurality of predefined conditions set by the user.

Yet another object of the embodiments herein is to provide a method and system for providing the stock price alerts on a periodic basis.

Yet another object of the embodiments herein is to provide a method and system for monitoring and tracking the latest stock market conditions of the various stock exchanges for creating an alert based on a status of the one or more scrip/stock.

Yet another object of the embodiments herein is to provide a method and system for processing a market feed data in milliseconds.

Yet another object of the embodiments herein is to provide a method and system for delivering the scrip/stock alerts to the user device at regular intervals.

These and other objects and advantages of the embodiments herein will become readily apparent from the following detailed description taken in conjunction with the accompanying drawings.

SUMMARY

The various embodiments herein provide a system for generating the stock price alerts based on a real-time market data. The system comprises a user mobile device, a central server, and an alerting module. A user downloads a mobile application from the central server and installs in the user mobile device for tracking and monitoring a scrip or stock price of one or more stocks. The mobile application is executed to activate the alerting module for tracking and monitoring a scrip or stock price of one or more stocks to provide an alert with respect to a stock on periodic intervals based on the preset condition and preset stock parameters set by the user.

According to an embodiment herein, the alerting module is deployed in the central server, and wherein the user accesses the alerting module through an application, software, or a browser for inputting a preferred setting.

According to an embodiment herein, the alerting module comprises a feed engine, a periodic alert engine, a conditional alert engine and an updating engine. The feed engine continuously monitors a plurality of stock market exchanges and downloads all the information related to the stocks as feed packets in the central server. The periodic alert engine and the conditional alert engine process the feed packets and provide the alerts to a user based on an alert conditions set by the user. The updating engine updates one or more matched scrip and condition text information in a database for a permanent record.

According to an embodiment herein, the user mobile device is any of a mobile computing device selected from a group consisting of a personal computer, a laptop, a tablet, a smart phones and a phablet.

According to an embodiment herein, the feed engine populates all the real time feeds from the stock market it one or more predetermined memory structures of the central server. The one or more predetermined memory structures a the central server comprises a tick-by-tick memory and current memory.

According to an embodiment herein, the user defines the alerts based on a plurality of parameters or conditions and wherein the plurality of parameters includes a stock, price, below price, and an above price.

According to an embodiment herein, the alerts are distributed to the user through a plurality of communication channels. The plurality of communication channels comprises Short Message Service (SMS), E-Mail, web pop-ups, push messages and other notifications.

According to an embodiment herein, the alerting module comprises one or more alerting algorithms adopted for servicing a plurality of business functions. The plurality of business functions include tracking price levels of stocks, alerting when a preset price of stock is reached, and portfolio computations.

According to an embodiment herein, the alerting module generates a plurality of events/alerts on a periodic basis for a real-time market feed data.

According to an embodiment herein, the feed engine and the conditional alert engine of the alerting module are operated in parallel.

According to one embodiment herein, a method is provided and executed on a computing device for generating stock price alerts based on real-time market data. The method comprising the steps of defining one or more conditions or parameters by an user for issuing an alert with respect a stock for an real-time market data; defining one or more periodic alerts for an real-time market data by the user; receiving a plurality of incoming feed packets from the one or more stock exchange markets to the central server; processing the received plurality of incoming feed packets b a feed engine; storing each of the plurality of processed feed packets in a tick-by-tick memory structure; storing each of the plurality of processed feed packets in a current memory structure; evaluating the plurality of feed packets in the tick-by-tick memory structure based on the one or more alert conditions defined by the user; providing conditional alerts by a conditional alert engine based on the plurality of feed packets stored in tick-by-tick memory structure, when the stock market exchange initiates a stock trading; and retrieving information from the current memory structure and comparing the retrieved information with the alert conditions defined by the user for the one or more periodic alerts, infer a preset periodic time interval is reached.

According to an embodiment herein, the conditional alert engine comprises one or more alert algorithms for matching the conditions set by the user with the plurality of feed packets stored in the tick-by-tick memory structure.

According to an embodiment herein, the step of processing the incoming feed packets from a stock exchange market by a feed engine comprises transferring a plurality of feed packets of a plurality of stocks through Universal Datagram Protocol (UDP) or Transmission Control Protocol (TCP) to the central server; processing the plurality of feed packets and assigning an arrival time of the plurality of feed packets by the feed engine deployed at the central server; extracting a plurality information relating to a stock exchange, and wherein the plurality of information includes security details, a newly added stock, new listings, a new stock price, a Last Traded Price (LTP) of a stock, open price, low price from the plurality of feed packets; and storing each of the plurality of feed packets in a plurality of memory structures respectively and wherein plurality of memory structures comprises a tick-by-tick memory structure and a current memory structure.

According to an embodiment herein, the feed engine and the conditional alert engine of the alerting module are operated in parallel.

According to an embodiment herein, the conditional alert engine provides a time stamp of receiving the plurality of feed packets with the feed engine, before reading the plurality of feed packets stored in the tick-by-tick memory structure. The feed packets with an arrival time earlier than a time of activation of the conditional alert engine stamp are read by the conditional alert engine. Further one or more feed packets read by the conditional alert engine are matched with one or more alert conditions set by the user.

According to an embodiment herein, one or more feed packets which satisfies the preset alert conditions set by the user are marked as occurred and are stored in a third memory structure.

According to an embodiment herein, the marked occurrences in the third memory structure are updated in a conditional alert database for a permanent storage by a persisting algorithm of an updating engine.

According to an embodiment herein, the third memory structure is created by a preferred database engine. The feed packets which are received before the time of activation of the conditional alert engine are processed by the conditional alert engine and then deleted from the tick-by-tick memory structure. Further, the tick-by-tick memory structure is initiated for storing the plurality of new feed packets.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled at the art front the allow ins description of the preferred embodiment and the accompanying drawings in which.

Although the specific features of the embodiments herein are shown in some drawings and not in others. This is done for convenience only as each feature may be combined with any or all of the other features in accordance with the present invention.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
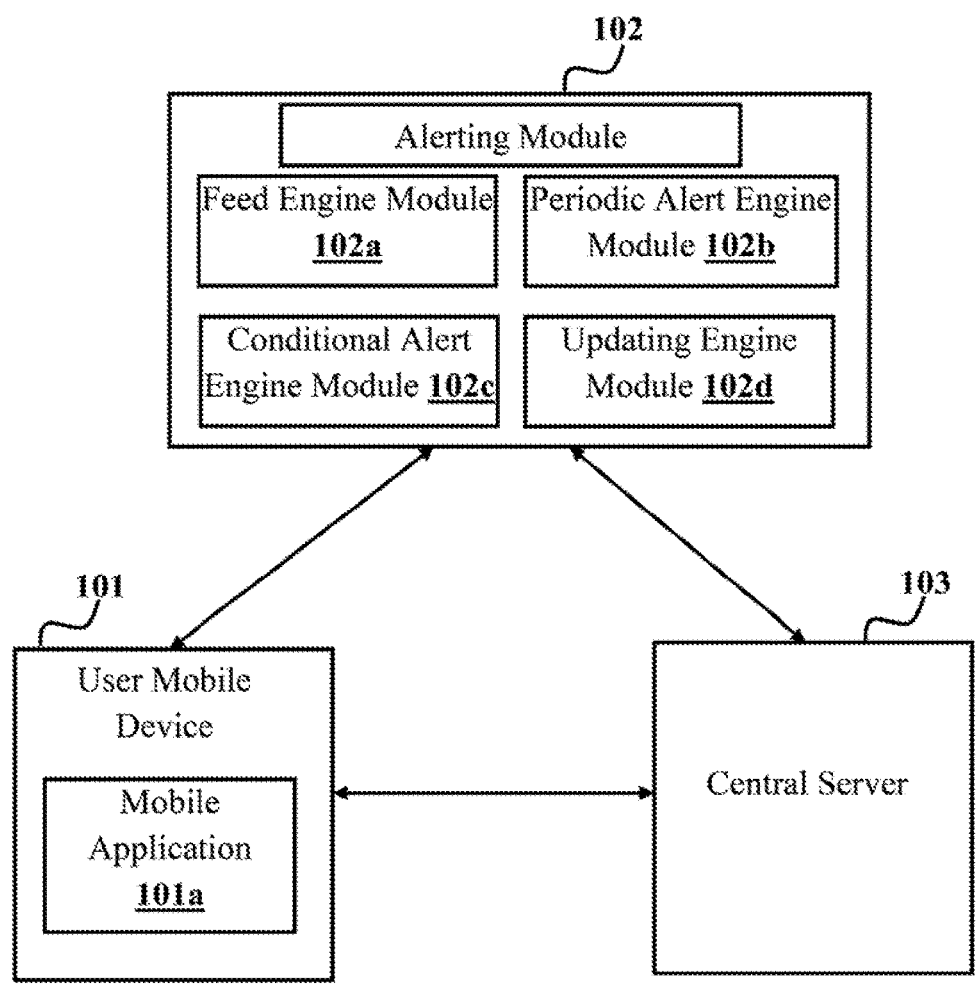
FIG. 1 illustrates a block diagram of a system architecture for generating the stock price alerts based on a real-time market data, according to an embodiment herein.

The various embodiments herein provide a system for generating the stock price alerts based on a real-time market data. FIG. 1 illustrates a block diagram of a system architecture for generating the stock price alerts based on a real-time market data, according to an embodiment herein. The system 100 comprises the user mobile device 101, the central server 103, and the alerting module 102. A user downloads the mobile application 101a from the central server 103 and installs in the user mobile device 101 for tracking and monitoring scrip or stock price of one or more stocks. The mobile application 101a is executed to activate the alerting module 102 for tracking and monitoring scrip or stock price of one or more stocks to provide an alert with respect to stock on periodic intervals based on preset conditions and preset stock parameters set by the user.

According to an embodiment herein, the alerting module 102 is deployed in the central server 103. The user accesses the alerting module 102 through an application, software, or a browser for inputting a preferred setting.

According to an embodiment herein, the alerting module 102 further comprises the feed engine module 102a, the periodic alert engine module 102b, the conditional alert engine module 102c and the updating engine module 102d. The feed engine module 102a continuously monitors a plurality of stock market exchanges and downloads all the information related to the stocks as the feed packets in the central server 103. The periodic alert engine module 102b and the conditional alert engine module 102c process the received feed packets and provides the alerts to a user based on an alert conditions set by the user. The updating engine module 102d updates one or more matched scrip and condition and text information in a database for a permanent record.

According to an embodiment herein, the user mobile device 101 is any of a mobile computing device selected from a group consisting of a personal computer, a laptop, a tablet, a smart phones and a phablet.

According to an embodiment herein, the feed engine module 102a populates all the real time feeds from the stock market into one or more predetermined memory structures of the central server 103.

According to an embodiment herein, the user defines the alerts based on a plurality of parameters or conditions and the plurality of parameters includes a stock, price, below price, and an above price.

According to an embodiment herein, the alerts are distributed to the user through a plurality of communication channels. The plurality of communication channels comprises Short Message Service (SMS), E-Mail, web pop-ups, push messages and other notifications.

According to an embodiment herein, the alerting module 102 comprises one or more alerting algorithms adopted for servicing the pluralities of business functions. The pluralities of business functions include tracking price levels of stocks, alerting when a preset price of stock is reached, and portfolio computations.

According to an embodiment herein, the alerting module 102 generates the plurality of events/alerts on a periodic basis for a real-time market feed data.

According to an embodiment herein, the feed engine module 102a and the conditional alert engine module 102c of the alerting module are operated in parallel.

Figure 2:
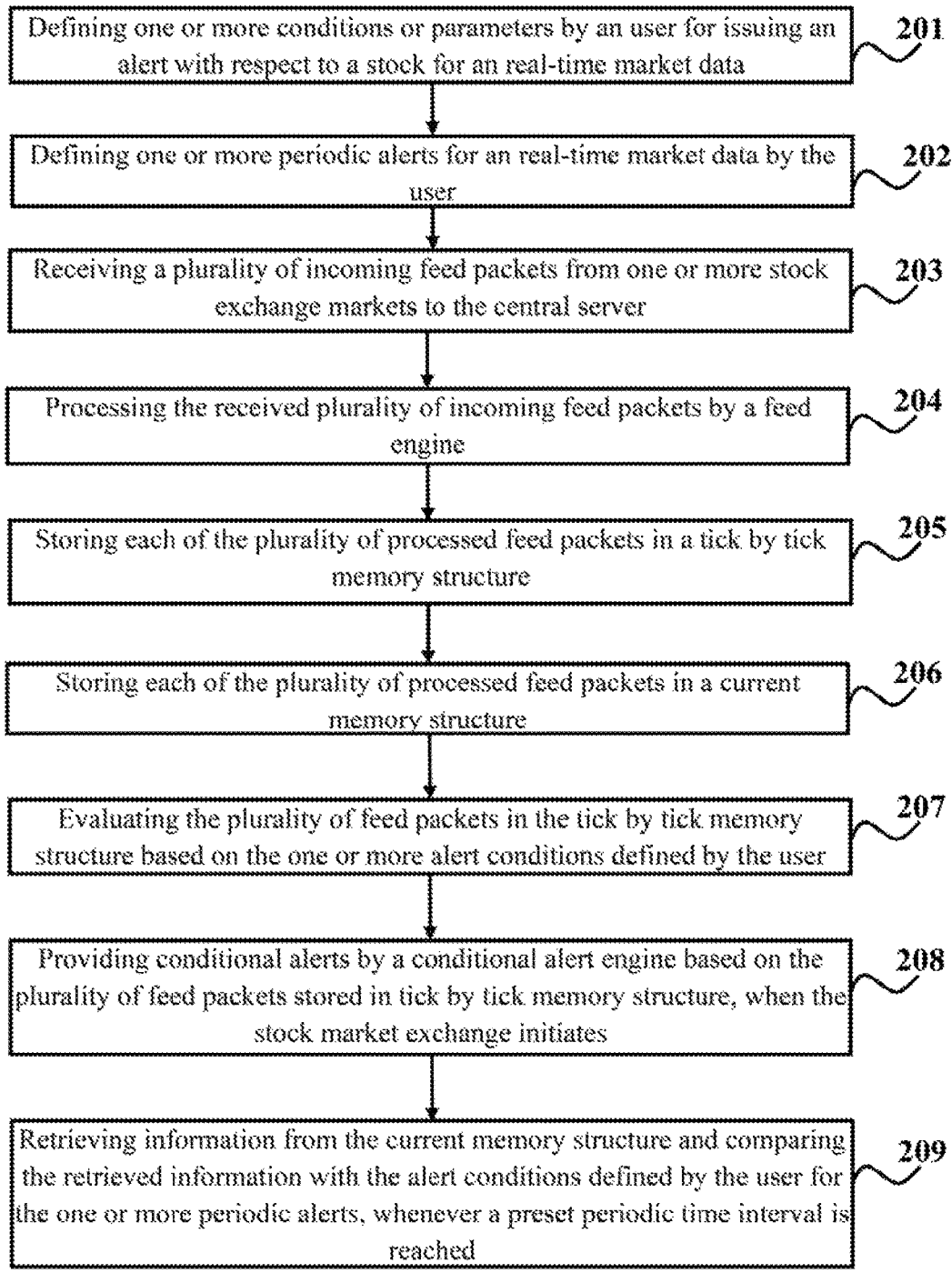
FIG. 2 illustrates a flowchart indicating a method for generating the stock price alerts based on a real-time market data, according to an embodiment herein.

FIG. 2 illustrates a flowchart indicating a method for generating the stock price alerts based on a real-time market data, according to an embodiment herein. The method comprises the steps of defining one or more conditions or parameters set by an user for issuing an alert with respect a stock for an real-time market data (201). One or more periodic alerts for a real-time market data is set or defined by the user (202). A plurality of incoming feed packets is received from one or more stock exchange markets to the central server (203). The plurality of received incoming feed packets is processed by a feed engine (204). Each or the plurality of processed feed packets is stored in a tick-by-tick memory structure (205). Each of the plurality of processed feed packets is stored in a current memory structure (206). The plurality of feed packets in the tick-by-tick memory structure is evaluated based on the one or more alert conditions defined by the user (207). The conditional alerts are provided by a conditional alert engine based on the plurality of feed packets stored in the tick-by-tick memory structure, when the stock market exchange initiates the trading operation (208). The information from the current memory structure are retrieved and compared with the alert conditions defined by the user for the one or more periodic alerts, whenever a preset periodic time interval is reached (209).

According to an embodiment herein, the conditional alert engine comprises one or more alert algorithms for matching the conditions set by the user with the plurality of feed packets stored in tick-by-tick memory structure.

Figure 3:
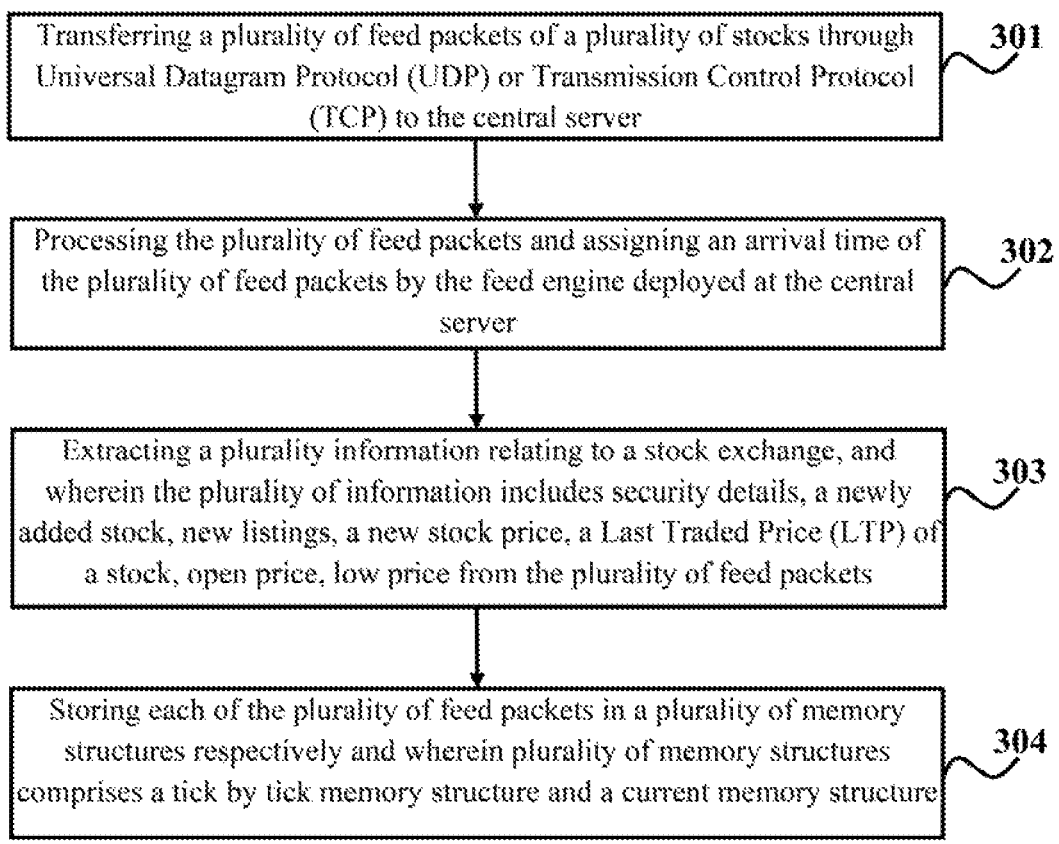
FIG. 3 illustrates a flowchart explaining a method for processing the incoming feed packets from a stock exchange market by a feed engine, according to an embodiment herein.

FIG. 3 illustrates a flowchart indicating a method for processing the incoming feed packets from a stock exchange market received by a feed engine, according to an embodiment herein. The method comprises the steps of transferring a plurality of feed packets of a plurality of stocks through Universal Datagram Protocol (UDP) or Transmission Control Protocol (TCP) to the central server (301). The plurality of feed packets are processing and assigned with a time stamp indicating the arrival time of the plurality of feed packets by the feed engine deployed at the central server (302). A plurality of information relating to a stock exchange is extracted and wherein the plurality of information includes security details, a newly added stock, new listings, a new stock price, a Last Traded Price (LTP) of a stock, open price, low price from the plurality of feed packets (303). Each of the plurality of teed packets is stored in a plurality of memory structures respectively and wherein plurality of memory structures comprises a tick-by-tick memory structure and a current memory structure (304).

According to an embodiment herein, the feed engine and the conditional alert engine of the alerting module are operated in parallel.

According to an embodiment herein, the conditional alert engine provides a time stamp of receiving the plurality of feed packets with the feed engine, before reading the plurality of feed packets stored in the tick-by -tick memory structure. The feed packets with an arrival time earlier than a time of activation of the conditional alert engine stamp are read by the conditional alert engine. Further one or more feed packets read by the conditional alert engine are matched with one or more alert conditions set by the user.

According to an embodiment herein, one or more feed packets which satisfies the preset alert conditions set by the user are marked as occurred and are stored in a third memory structure.

According to an embodiment herein, the marked occurrences in the third memory structure are updated in a conditional alert database for a permanent storage by a persisting algorithm of an updating engine.

According to an embodiment herein, the third memory structure is created by a preferred database engine. The feed packets which are received before the time of activation of the conditional alert engine are processed by the conditional alert engine and then deleted from the tick-by-tick memory structure. Further, the tick-by-tick memory structure is initiated for storing plurality of new feed packets.

Figure 4:
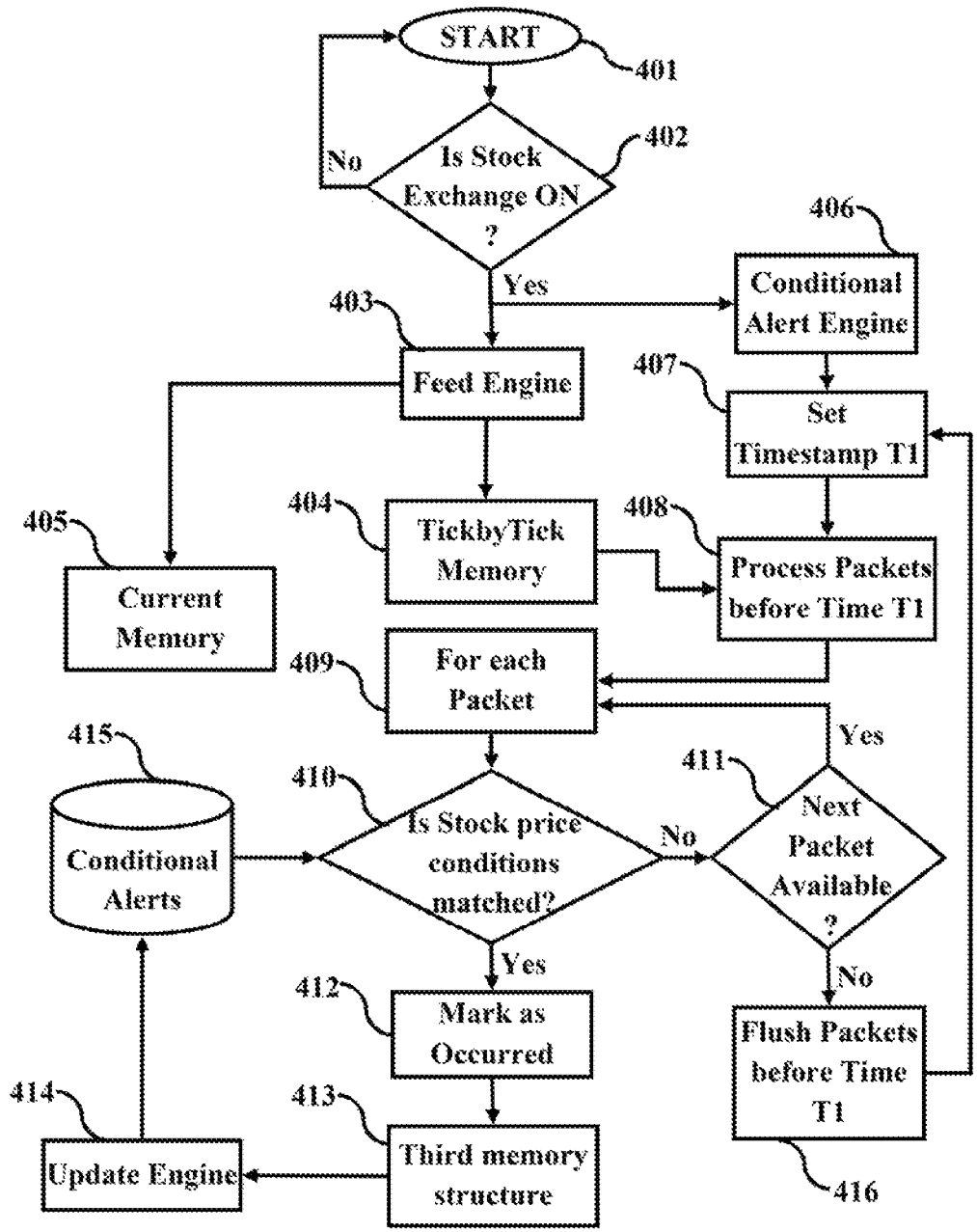
FIG. 4 illustrates a flowchart explaining a method for providing the conditional alerts to a user based on a real time market data, according to an embodiment herein.

FIG. 4 illustrates a flow chart indicating a method for providing the conditional alerts to a user based on a real time market data, according to an embodiment herein. An alerting module residing in the central server is initiated when a stock market exchange opens/initiates a stock trading on a day (401). The alerting module keeps checking the stock exchange market status i.e. whether the stock exchange market is open or closed (402). The alerting module comprises a feed engine 403, a conditional alert engine 406 and an update engine 410.

According to an embodiment herein, the feed engine 403 is initiated when the stock market exchange is ON for a day. The feed engine 403 is adapted for monitoring, tracking and downloading the real time market feed packets to the server. The feed packets received from the stock market exchanges comprise the information relating to the scrip of one or more preferred stocks. Each of the feed packets comprises a plurality of market data such as price, stock, open price, to price and the like. In addition to the pricing, the feed packets are marked by an arrival time stamp at which the packet arrived in the server. The time stamp is marked by the feed engine 403.

According to an embodiment herein, the feed engine 403 populates the real time feed packets from the stock exchange market into a plurality of predefined memory structures in the server. The memory structures herein comprise a tick-by-tick memory 404 and a current memory 405. The tick-by-tick memory 404 stores all the feed packets in an incremental manner and the current memory 105 stores the latest updates of preset/unique stocks.

According to an embodiment herein, the conditional alert engine 406 comprises an alerting algorithm which is run or executed continuously while the stock market exchanges are kept open. The conditional alert engine 406 marks/sets a separate time stamp T1 407 before processing the arrived feed packets for alert generation. The conditional alert engine 406 then processes all the feed packets individually/singly or combinedly at a time, which is earlier than the time T1 407. The processing of the feed packets comprises comparing or matching the stock price conditions of one or more scrip with a user defined alert conditions (409).

According to an embodiment herein, the alert conditions are provided for stock, when the price of the stock is below or above a threshold price value. The values for the alert conditions are stored inside a database 408. The conditional alert engine 406 continuously compares the feed packets with the user defined conditions till all the arrived feed packets are processed. When a match occurs, the conditional alert engine 406 marks the conditions as occurred 411 and stores the occurred conditions in a third memory structure 412. The third memory structure is created by the update engine and holds the data temporarily. Since, the third memory structure stores the data temporarily, an update engine is invoked which updates the occurred conditions in the database 408 for permanent storage. From the conditional alert database 408, the alerts are sent to the user to the user device through at least of an SMS, E-Mail web pop-ups and so on.

According to an embodiment herein, all the feed packets in the tick-by-tick memory arrived before the time stamp T1, are compared against the stock price conditions that have not occurred and defined in a database table. The feed packets which are received before T1 is flushed front the tick by tick memory 404. After flushing the tick-by-tick memory 404, the alert engine again marks a timestamp T2 for the next set of real time feed packets.

Figure 5:
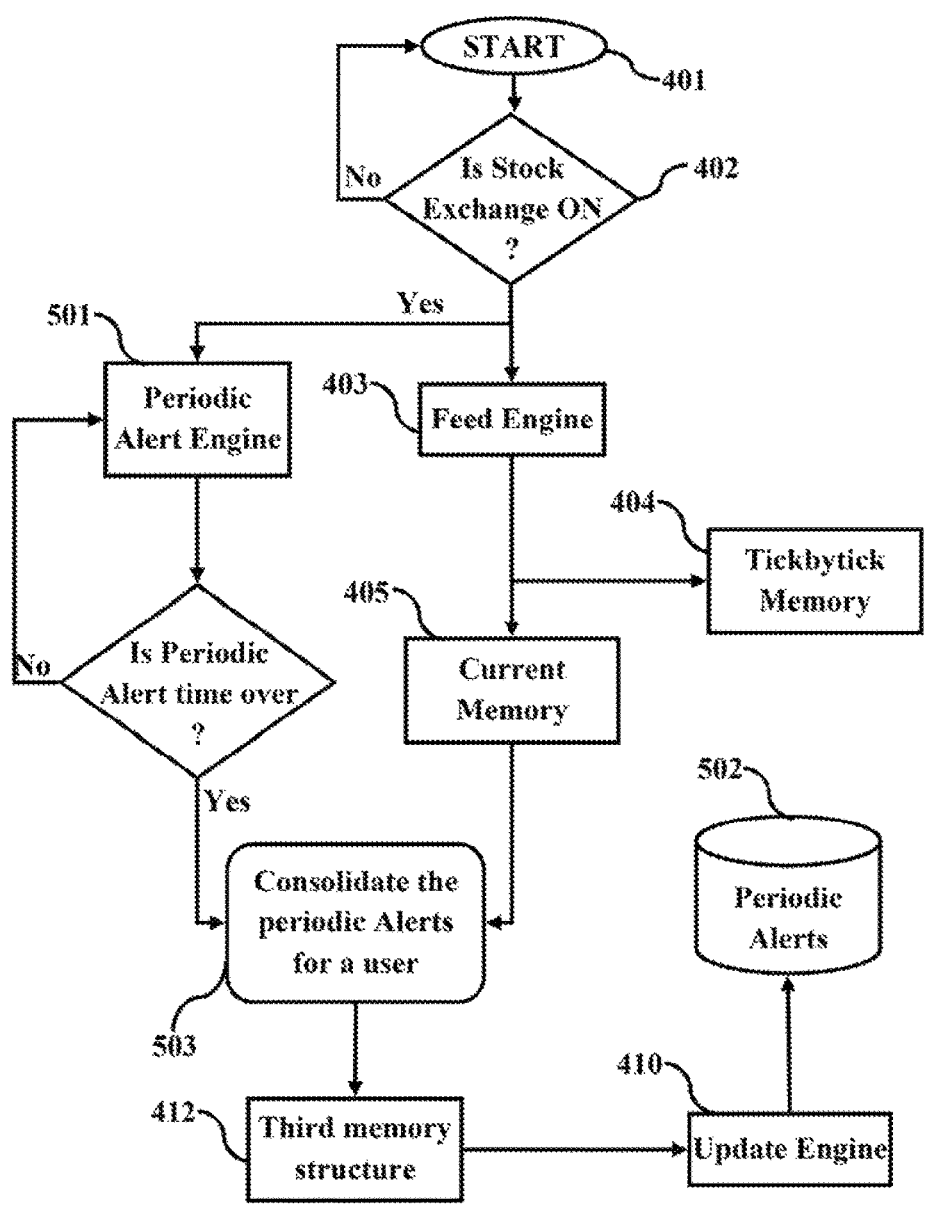
FIG. 5 illustrates a flowchart explaining a method for providing periodic alerts to a user based on real time market data at fixed time intervals, according to an embodiment herein.

FIG. 5 illustrates a flow chart explaining a method for providing the periodic alerts to a user based on a real time market data at fixed time intervals, according to an embodiment herein. The feed engine 403 and the periodic alert engine 401 are initiated when the stock market exchange is opened and a stock trading is initiated on a day. The feed engine 403 processes the incoming feed packets and assigns an arrival time stamp. The real time feed packets are stored in the tick-by-tick memory 404 and the latest unique update of a stock is stored in the current memory 405. The alerting module invokes the periodic alert engine 501 to run continuously during the stock exchange trading hours and at the time interval set by the user, for instance every one minute time interval. Upon the completion of the periodic alert time, the periodic alert engine compares the information present in the current memory 405 structure with the user settings. The comparison is executed for all the stocks selected by the user. The periodic alert engine 501 creates the periodic alerts for all the stocks defined by users which satisfy the current program run fir alerting the users. The periodic alert engine 501 creates the alerts by takin the latest stock price from current memory structure. The alerts are stored in the third memory structure temporarily. For permanently storing the consolidated alert, an update engine 410 preserves the consolidated alerts 502 to a periodic alert database 503. From the periodic alert database 503, alerts are sent to the user through SMS, E-Mail etc.

Figure 6:
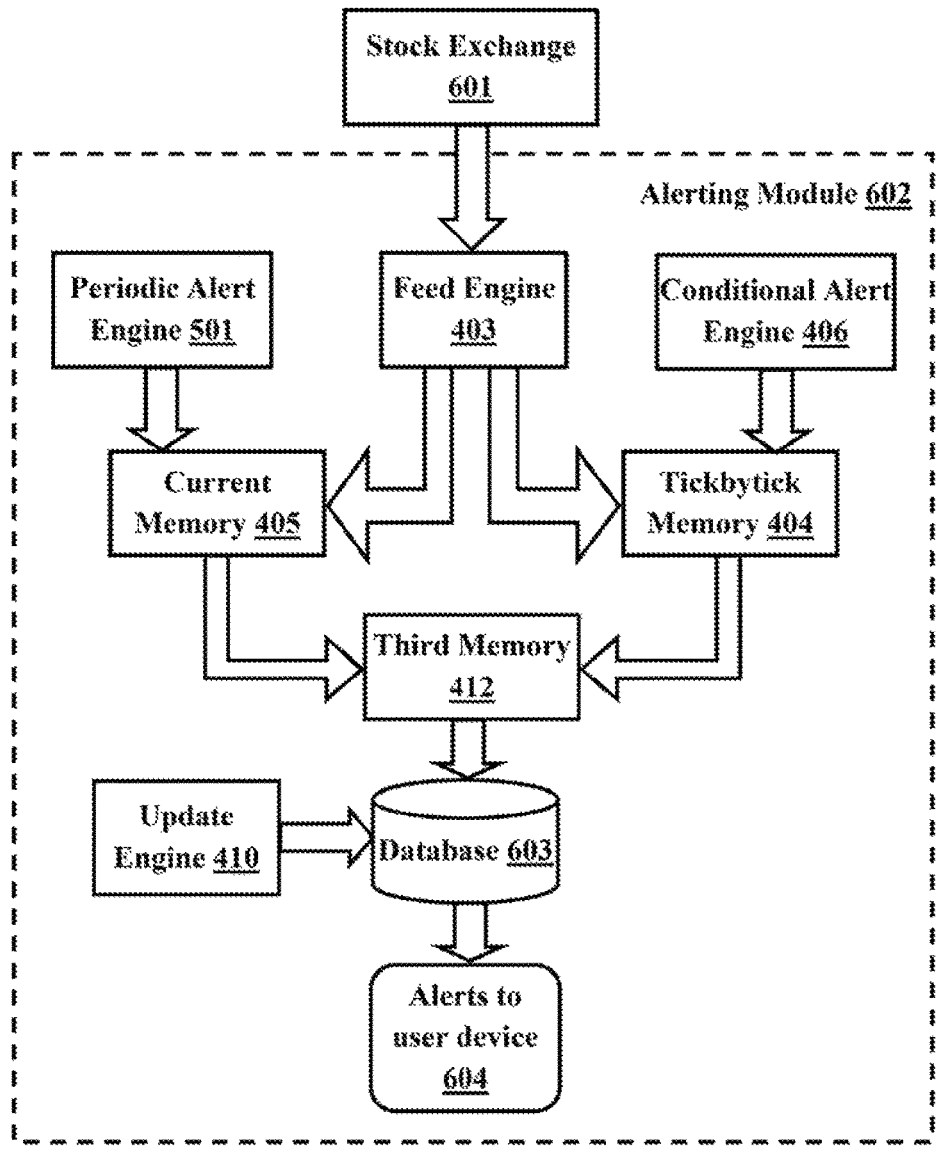
FIG. 6 illustrates a functional block diagram of an alerting module in a system for providing stock price alerts to a user based on real time market data, according to an embodiment herein.

FIG. 6 illustrates a functional block diagram of a system for providing the stock price alerts to a user based on real time market data, according to an embodiment herein. The system comprises an alerting module 602 for processing the millions of defined scrip price levels against the real-time market data provided by the stock exchange 601 to determine whether a particular/preset price of a Stock is reached. When the condition is satisfied, then the alerting module generates an alert for providing the timely alerts to a user.

The alerts are sent to the user on a user mobile device including but not limited to the smart phones, computer, laptops etc for making informed and profitable decision based on the alert received.

According to an embodiment herein, the alerting module 602 is deployed in a server. Alternately, the alerting module 602 is provided as an application to be installed in a user preferred mobile devices. For providing the alerts to the user, the alerting module 602 adopts a plurality of processing engines comprising a periodic alert engine 501, a feed engine 403, a conditional alert engine 406 and an update engine 410. The alerting module 602 comprises a plurality of memory structures provided for storing the real time stock exchange data before and after processing. The memory structure comprises a current memory 405, a tick-by-tick memory 404 and a third memory 412. The user first provides values for plurality of alert parameters based on which alerts are delivered to the user comprising a stock value, below value, above value, price, LTP, periodic time interval, etc.

According to an embodiment herein, the alerting module 602 is synchronized with the stock exchange 601 market. When a stock trading operation is initiated/started on a day in a stock exchange 601, the alerting module 602 deployed in the server or cloud is also initiated/activated to monitor the prices. The feed engine 403 starts receiving the feed packets from the stock exchange 601 through a UDP or TCP. The feed engine 403 processes the plurality of incoming feed packets and marks or allocates an arrival time stamp to each of the received feed packets. The feed engine 403 stores all the details relating to the one or more user preferred stocks in the tick-by-tick memory 404. On the other side, the current memory 405 structure stores only the latest unique stock details for each of the user preferred stocks. The tick-by-tick memory 404 is used by the conditional alert engine 406 whereas the current memory 405 is used by periodic alert engine 501.

According to an embodiment herein, the periodic alert engine 501 is activated on a regular interval of time, when the time period set by the user is reached. The periodic alert engine 501 processes the content of the current memory 405 and provides a consolidated alert to the user for one or more stocks. While processing, the content of the current memory 405 is matched with the user defined alert settings. The matched parameters are marked as occurred and is then stored in a third memory 412. From the third memory 412, the update engine 410 preserves/stores the marked occurrences into a database 603 for permanent storage. Finally from the database 603, the alerts 604 are sent to the user mobile device through an SMS, E-Mail, Push messages etc over a wired or wireless communication channel.

In contrast to the periodic alert engine 501, the conditional alert engine 406 is activated when the stock exchange 601 is initiated/started for the stock trading operations. Further, the conditional alert engine 406 processes the feed packets stored in the tick-by-tick memory 404. Before processing the feed packets, die conditional alert engine 406 marks a time stamp T1. The conditional alert engine 406 processes all the feed packets received before the time T1. The processing comprises matching the content of the feed packets wherein the contents include stock, price, above/below values, etc., with the user settings. When a match is occurred/found, then the corresponding matched information is marked as occurred and stored in the third memory 412. From the third memory 412, the update engine 410 preserves/stores the marked occurrences into the database 603 for permanent storage. Finally, the alerts 604 are distributed from the database 603 to the user mobile device through an SMS, E-Mail, Push messages etc., over a wired or wireless communication channel. Once all the feed packets before the time T1 is processed form the tick-by-tick memory 404, then the tick-by-tick memory 404 is flushed. The tick-by-tick memory 404 then stores the new feed packets received after the time stamp T1. The conditional alert engine 406 again marks a time stamp T2 before processing the next set of feed packets. The processing continues till the stock market is closed for the day with respect to the trading operation and again opened on the next day tar a stock trading operation.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, the embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc, may be passed, forwarded, or transmitted via any suitable means including memory sharing, message passing, token passing, network transmission, etc.

For firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, and volatile, non-volatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for generating stock price alerts based on real-time market data, the system comprises:
   a user mobile device; and
   a central server;
   an alerting module, wherein the alerting module is deployed in the central server, and wherein the alerting module is accessed through an application, software, or a browser for inputting a preferred setting, and wherein the alerting module further comprises:
   a feed engine, and wherein the feed engine is configured to continuously monitor a plurality of stock market exchanges and download all the information related to the stocks as feed packets in the central server;
   a periodic alert engine;
   a conditional alert engine, and wherein the periodic alert engine and the conditional alert engine are configured to process the feed packets and provide alerts to a user based on an alert conditions set by the user; and
   an updating engine, and wherein the updating engine is configured to updates one or more matched scrip and condition text information in a database for a permanent record;
   wherein the user mobile device is operated and configured to download a mobile application from the central server, and wherein the downloaded mobile application is installed in the user mobile device, and wherein the mobile application is run and executed for tracking and monitoring scrip or stock price of one or more stocks, wherein the mobile application is executed to activate the alerting module, and wherein the alerting module is run on a hardware processor in the central server and configured for tracking and monitoring scrip or stock price of one or more stocks to provide an alert with respect to stock on a periodic intervals based on preset conditions and preset stock parameters set by the user through the mobile device, and wherein the conditional alert engine is configured to provide a time stamp of receiving the plurality of feed packets with the feed engine, before reading the plurality of feed packets stored in the tick-by-tick memory structure, and wherein the feed packets with an arrival time earlier than a time of activation of the conditional alert engine stamp are read by the conditional alert engine, and wherein one or more feed packets read by the conditional alert engine are matched with one or more alert conditions set by the user, and wherein the feed engine is configured to populate all the real time feeds from the stock market into one or more predetermined memory structures of the central server, and wherein the one or more predetermined memory structures includes a tick-by-tick memory and a permanent memory.

2. The system according to claim 1, wherein the user mobile device is any one of a mobile computing device selected from a group consisting of a personal computer, a laptop, a tablet, a smart phones and a phablet.

3. The system according to claim 1, wherein the user mobile device is configured to enable the user to define alerts based on a plurality of parameters or conditions and wherein the plurality of parameters includes a stock, price, below price, and an above price.

4. The system according to claim 1, wherein the alerts are distributed to the user through a plurality of communication channels, and wherein the plurality of communication channels comprises Short Message Service (SMS), E-Mail, web pop-ups, push messages and other notifications.

5. The system according to claim 1, wherein the alerting module comprises one or more alerting algorithms adopted for servicing a pluralities of business functions, and wherein a pluralities of business functions includes tracking price levels of stocks, alerting when a preset price of stock is reached, and portfolio computations.

6. The system according to claim 1, wherein the alerting module is configured to generate events/alerts on a periodic basis for a real-time market feed data.

7. The method according to claim 1, wherein the feed engine and the conditional alert engine of the alerting module are operated in parallel.

8. A computer implemented method comprising instructions stored on non-transitory computer readable storage medium and executed on a computing device comprising a hardware processor and a memory for generating stock price alerts based on real-time market data, the method comprising steps of:
   defining one or more conditions or parameters by an user through a user mobile device by executing a mobile application for issuing an alert with respect a stock for an real-time market data, and wherein the user mobile device is any one of a mobile computing device selected from a group consisting of a personal computer, a laptop, a tablet, a smart phones and a phablet, and wherein the mobile application is down loaded from a central server and installed in the user mobile device;

defining one or more periodic alerts for an real-time market data by the user through an alerting module provided in the central server, and wherein the alerting module is accessed by the user through the user mobile device through an application, software, or a browser for inputting a preferred setting;

receiving a plurality of incoming feed packets from one or more stock exchange markets through a feed engine at the central server, and wherein the feed engine is provided in the alerting module;

processing the received plurality of incoming feed packets by the feed engine; storing each of the plurality of processed feed packets in a tick-by-tick memory structure;

storing each of the plurality of processed feed packets in a current memory structure by the feed engine;

evaluating the plurality of feed packets in the tick-by-tick memory structure by the feed engine based on the one or more alert conditions defined by the user;

providing conditional alerts by a conditional alert engine based on the plurality of feed packets stored in tick-by-tick memory structure, when the stock market exchange initiates; and retrieving information from the current memory structure and comparing the retrieved information with the alert conditions defined by the user for providing the one or more periodic alerts with a periodic alert engine provided in the alerting module, whenever a preset periodic time interval is reached;

wherein the conditional alert engine is configured to provide a time stamp of receiving the plurality of feed packets with the feed engine, before reading the plurality of feed packets stored in the tick-by-tick memory structure, and wherein the feed packets with an arrival time earlier than a time of activation of the conditional alert engine stamp are read by the conditional alert engine, and wherein one or more feed packets read by the conditional alert engine are matched with one or more alert conditions set by the user, and wherein the feed engine is configured to populate all the real time feeds from the stock market into one or more predetermined memory structures of the central server, and wherein the one or more predetermined memory structures includes a tick-by-tick memory and a permanent memory.

9. The method according to claim 8, wherein the conditional alert engine comprises one or more alert algorithms for matching the conditions set by the user with the plurality of feed packets stored in tick-by-tick memory structure.

10. The method according to claim 8, wherein the step of processing incoming feed packets from a stock exchange market by a feed engine comprises:

transferring a plurality of feed packets of a plurality of stocks through Universal Datagram Protocol (UDP) or Transmission Control Protocol (TCP) to the central server;

processing the plurality of feed packets and assigning an arrival time of the plurality of feed packets by the feed engine deployed at the central server;

extracting a plurality information relating to a stock exchange, and wherein the plurality of information includes security details, a newly added stock, new listings, a new stock price, a Last Traded Price (LTP) of a stock, open price, low price from the plurality of feed packets; and storing each of the plurality of feed packets in a plurality of memory structures respectively and wherein the plurality of memory structures comprises a tick-by-tick memory structure and a current memory structure.

11. The method according to claim 8, wherein the feed engine and the conditional alert engine of the alerting module are operated in parallel.

12. The method according to claim 8, wherein one or more feed packets which satisfies the preset alert conditions set by the user are marked as occurred and are stored in a third memory structure.

13. The method according to claim 8, wherein a persisting algorithm of an updating engine is executed on the hardware processor and configured to update the marked occurrences in the third memory structure in a conditional alert database for a permanent storage.

14. The method according to claim 8, wherein the third memory structure is created by a preferred database engine, and wherein the feed packets which are received before the time of activation of the conditional alert engine are processed by the conditional alert engine and then deleted from the tick-by-tick memory structure, and wherein the tick-by-tick memory structure is initiated for storing plurality of new feed packets.

15. The method according to claim 8, wherein a consolidated alert comprising information relating to one or more stocks is created, and wherein the consolidated alert is stored in the third memory structure.

* * * * *